US009189700B2

(12) United States Patent
Lee

(10) Patent No.: US 9,189,700 B2
(45) Date of Patent: Nov. 17, 2015

(54) DEVICE AND METHOD FOR ANALYZING THE CORRELATION BETWEEN AN IMAGE AND ANOTHER IMAGE OR BETWEEN AN IMAGE AND A VIDEO

(75) Inventor: Jaehyung Lee, Gyeonggi-do (KR)

(73) Assignee: ENSWERS CO., LTD., Seoul (KR)

(*) Notice: Subject to any disclaimer, the term of this patent is extended or adjusted under 35 U.S.C. 154(b) by 93 days.

(21) Appl. No.: 14/000,266

(22) PCT Filed: Nov. 11, 2011

(86) PCT No.: PCT/KR2011/008604
§ 371 (c)(1),
(2), (4) Date: Oct. 29, 2013

(87) PCT Pub. No.: WO2012/115332
PCT Pub. Date: Aug. 30, 2012

(65) Prior Publication Data
US 2014/0044361 A1    Feb. 13, 2014

(30) Foreign Application Priority Data
Feb. 21, 2011    (KR) .................. 10-2011-0015049

(51) Int. Cl.
*G06K 9/46*    (2006.01)
*G06K 9/62*    (2006.01)
(52) U.S. Cl.
CPC ............ *G06K 9/4604* (2013.01); *G06K 9/6211* (2013.01)
(58) Field of Classification Search
CPC .................................................. G06K 9/4604
USPC .................. 382/210, 103, 155, 159, 190–192
See application file for complete search history.

(56) References Cited
U.S. PATENT DOCUMENTS
6,711,293 B1    3/2004 Lowe

FOREIGN PATENT DOCUMENTS
KR    10-1993-0001098 A    1/1993
KR    10-2000-0060758 A    10/2000
(Continued)

OTHER PUBLICATIONS
Lowe: "Distinctive image features from scale-invariant keypoints", Intl. J. of Computer Vision, 2004.*
(Continued)

*Primary Examiner* — Ruiping Li
(74) *Attorney, Agent, or Firm* — Rabin & Berdo, P.C.

(57) ABSTRACT

The present invention relates to a device and method for analyzing the correlation between an image and another image or between an image and a video. The device for analyzing the correlation between images and the method for using same include: a feature data generating unit for determining a feature point of an image and generating feature data which includes feature point orientation information on each determined feature point; and a relation analyzing unit for analyzing the correlation between an image and another image using feature data generated from the feature data generating unit. The relation analyzing unit includes: a unit for determining corresponding feature points, which determines a pair of corresponding feature points between compared images using feature data generated from the feature data generating unit; and a reliability estimating unit for estimating the reliability of the analysis of the relation between images on the basis of feature point orientation information on a feature point, in pairs of feature points determined by the unit for determining corresponding feature points. According to the present invention, provided are a device and method for quickly and efficiently analyzing a correlation, such as whether or not there is a similarity between an image and another image or between an image and a video, wherein said video includes an image, or a frame of said video corresponds to an image.

8 Claims, 14 Drawing Sheets

(56) References Cited

FOREIGN PATENT DOCUMENTS

| | | |
|---|---|---|
| KR | 10-2004-0089971 A | 10/2004 |
| KR | 10-0811835 B1 | 3/2008 |
| KR | 10-1165357 B1 | 7/2012 |

OTHER PUBLICATIONS

Herbert Bay et al., "SURF: Speeded Up Robust Features", Proceedings of the 9th European Conference on Computer Vision, 2006, pp. 404-417, vol. 3951, Part 1.

* cited by examiner

DEVICE AND METHOD FOR ANALYZING THE CORRELATION BETWEEN AN IMAGE AND ANOTHER IMAGE OR BETWEEN AN IMAGE AND A VIDEO

TECHNICAL FIELD

The present invention relates, in general, to an apparatus and method for analyzing a correlation between images or between an image and a video and, more particularly, to an apparatus and method that are capable of promptly and efficiently analyzing correlations indicating whether identicalness is present between images or between an image and a video, or which video an image is included in, and which frame of a video an image corresponds to.

BACKGROUND ART

Technology for comparing an image with another image or comparing an image with a video and determining whether identicalness is present between them or whether an inclusion relation is present between them has been proposed in various forms in the field of computer vision, such as image matching and object tracking. Such technology chiefly uses a method of extracting feature points from an image or frame-based images constituting a video, causing the extracted feature points to correspond to each other, and comparing the feature points with each other, and aims to present exact comparison results more quickly by utilizing a feature point extraction scheme and a specific algorithm upon comparing the corresponding features points. As is well known in the art, feature points (or interest points) are points capable of representing the features of an image, and denote points capable of desirably describing the features of an image or a set of points, regardless of variations in the scale, rotation, or distortion of an image. As feature points, several thousands or several tens of thousands of feature points per picture, for example, may be extracted although they differ depending on the size and content of a given image and the type of feature point extraction/determination method. Such feature points are widely used in the field of image processing or computer vision, and are used in various tasks, such as object recognition, motion tracking, and determination of identicalness between images by, for example, extracting feature points and searching two images for corresponding parts using the feature data of the extracted feature points. However, in accordance with such a conventional feature point extraction/determination method, there are many cases where an excessively large number of feature points are acquired from a given image, so that limitations are reached in that the amount of data to be processed in a post-processing procedure for performing image comparison, object tracking, etc. using the feature points becomes excessive, and then operation time is greatly lengthened. For example, as methods of extracting feature points from an image and forming feature data of the extracted feature points, there are various proposed methods, such as a Scale-Invariant Feature Transform (SIFT) algorithm disclosed in U.S. Pat. No. 6,711,293 (by David G. Lowe) and a Speed Up Robust Features (SURF) algorithm (by H. Bay, T. Tuytelaars and L. van Gool (2006), "SURF: Speeded Up Robust Features", Proceedings of the 9th European Conference on Computer Vision, Springer LNCS volume 3951, part 1. pp. 404~417). However, since such conventional technology requires approximately several thousands of several tens-dimensional feature vectors per image, there is a problem in that the operation process is complicated, and the amount of data to be processed is large, so that an excessively long computation time is required, thus causing many problems when a large amount of data must be processed. Therefore, the development of technology capable of providing exact results while reducing operation time and the amount of data to be processed by using a smaller number of feature points is required.

In particular, recently, with the improvement of the transfer rate of networks, together with the development of the Internet, mobile technology, and environment, the consumption of multimedia data such as videos or images has been remarkably increased. For example, websites on which video data such as for dramas or movies can be watched have been widely used, and the number of video community sites on which various services allowing users to personally upload, search, and share various types of video data can be implemented has also rapidly increased. Further, multimedia services such as images or videos have been provided through various channels, such as Internet portal sites, User Generated Contents (UGC) sites, blogs, cafes, and web-hard sites. Furthermore, recently, with the development of the mobile environment, such as in the popularization of smart phones and the increase in wireless Local Area Network (LAN) environments, the rate of consumption of multimedia data even in the mobile environment has a tendency to exponentially increase. In this way, as images or videos are not only used in a specific field, but also widely used in web environment, there is a requirement for the development of technology which can more promptly and exactly determine relations between an image and another image or between an image and a video, and then use such relations for various types of additional services related to images or videos.

DISCLOSURE

Technical Problem

Accordingly, the present invention has been made keeping in mind the above problems, and an object of the present invention is to provide an apparatus and method that can promptly and efficiently analyze correlations indicating whether identicalness is present between images or between an image and a video, or which video an image is included in, and which frame of a video an image corresponds to.

Another object of the present invention is to provide an apparatus and method that can more conveniently and efficiently generate feature data indicating the features of images and videos compared to a conventional method, and that can rapidly perform the analysis of relations, such as the comparison and search regarding whether identicalness is present between an image and another image or between an image and a video, using the feature data within a very short time.

A further object of the present invention is to provide an apparatus and method that can determine reliability based on a probability function upon comparing an image with another image or comparing an image with a video, thus improving the reliability of comparison and search and also providing probabilistic values for the results of comparison and search.

Technical Solution

In order to accomplish the above objects, the present invention provides an apparatus for analyzing a correlation between images, including a feature data generation unit for determining feature points of each image, and generating feature data including pieces of feature point orientation information for the respective feature points; and a relation analysis unit for analyzing a correlation between an image and another image using the feature data generated by the feature data generation unit, wherein the relation analysis unit includes a corresponding feature point determination unit for determining pairs of corresponding feature points between the images to be compared using the feature data generated by the feature data generation unit; and a reliability estimation unit for estimating reliability of analysis of a correlation between the images, based on the feature point orientation information of the feature points included in the feature point pairs determined by the corresponding feature point determination unit.

In this case, the reliability estimation unit may estimate the reliability of the analysis of the relation between the images, based on a probability density function for estimated values of differences between orientations of the feature points included in the respective feature point pairs.

Further, the probability density function may be used to calculate a mean and a variation of the estimated values, a probability (p) of pairs of feature points being observed may be calculated using a standard normal distribution function based on the mean and the variation, and the calculated probability (p) or a function based on the probability (p) may be compared with a threshold, thus enabling the reliability of the analysis of the correlation between the images to be estimated.

Further, the probability (p) of the pairs of feature points being observed may be calculated by $$p = \prod_{i=1}^{n} G\left(\frac{\hat{d}_i - \hat{d}}{\sigma}\right)$$

(where n denotes a number of pairs of corresponding feature points, G denotes a probability function of a standard normal distribution having a mean of 0 and a standard deviation of 1, and $\hat{d}$ denotes a mean of differences between orientations of all feature point pairs $$(\hat{d} = \frac{1}{n}\sum_{i=1}^{n} \theta(p_i) - \theta(q_i),$$

and $\hat{d}_i$ denotes estimated values of the differences between the orientations of all feature point pairs based on the probability density function).

Furthermore, the feature data generation unit may include a feature point determination unit for determining feature points from each image and extracting feature point information of the determined feature points; a feature point orientation estimation unit for estimating pieces of orientation information for the respective feature points determined by the feature point determination unit; and a feature data configuration unit for generating binary feature vectors based on the feature point information and the orientation information, for the respective feature points determined by the feature point determination unit, and generating feature data of the image including the generated binary feature vectors.

Furthermore, the feature data configuration unit may generate, for the feature points determined by the feature point determination unit, surrounding image areas including the respective feature points, align the generated surrounding image areas in an identical orientation based on the orientation information, divide each of aligned surrounding image areas into sub-regions, and generate binary feature vectors based on averages of brightness values of the divided sub-regions.

Furthermore, each binary feature vector may be generated by at least one selected from among difference vectors and double-difference vectors obtained from the averages of brightness values of the sub-regions.

Furthermore, selection of at least one from among the difference vectors and the double-difference vectors obtained from averages of brightness values of the sub-regions may be performed in correspondence with respective bits of the binary feature vector.

Furthermore, a linear combination or a nonlinear combination may be calculated for the difference vectors and the double-difference vectors selected in correspondence with the respective bits, and resulting values of the calculation may be compared with a threshold, thus enabling values of corresponding bits of the binary feature vector to be determined.

Furthermore, alignment may be performed based on a criterion preset for the respective bits of the binary feature vector.

Furthermore, the feature point information extracted by the feature point determination unit may include intensity of each feature point, and the feature point determination unit may further include a feature point filtering unit for determining a point having larger intensity than points located in a surrounding area of the corresponding feature point, to be a final feature point, based on the intensity of the feature point.

Furthermore, the feature point filtering unit may determine important points $R_2(c_i)$ satisfying expression $$R_2(c_i) = \{c_i \mid f(c_i) > \max_{R_1(c_i)} [f(c_i)] \times T_1\}$$

among the points located in the surrounding area of the feature point (where $c_i$ denotes an i-th feature point, $f(c_i)$ denotes intensity of the i-th feature point, $R_1(c_i)$ denotes a set of points in the surrounding area of the feature point, $$\max_{R_1(c_i)} [f(c_i)]$$

denotes a maximum value of intensities of $R_1(c_i)$, and $T_1$ denotes a threshold) and determine a feature point satisfying expression $$f(c_i) > \frac{\sum_{c_j \in R_2(c_i)} f(c_i)}{\#(R_2(c_i))} \times T_2$$

to be the final feature point (where # denotes an operator for obtaining a size of the set and $T_2$ denotes a threshold).

In accordance with another aspect of the present invention, there is provided a method of analyzing a correlation between images, including a first step of determining feature points of each image, and generating feature data including pieces of feature point orientation information for the respective feature points; and a second step of analyzing a correlation between an image and another image using the feature data generated at the first step, wherein the second step is configured to determine pairs of corresponding feature points between the images to be compared using the generated feature data and to estimate reliability of analysis of a correlation between the images, based on the feature point orientation information of the feature points included in the determined feature point pairs.

In accordance with a further aspect of the present invention, there is provided an apparatus for analyzing a correlation between an image and a video, including an image feature data generation unit for determining feature points of an image and generating image feature data including pieces of feature point orientation information for the respective feature points; a video feature data generation unit for determining, for a video, feature points for one or more of frames constituting the video, and generating pieces of frame-based image feature data including pieces of feature point orientation information for the respective frame-based feature points, thus generating video feature data; and a relation analysis unit for comparing the image feature data with the video feature data and then analyzing a correlation between the image and the video, wherein the relation analysis unit comprises a candidate selection unit for determining a matching video by comparing the image feature data with the pieces of frame-based image feature data of the video feature data, and determining one or more of frames constituting the determined video, or for determining one or more matching frames by comparing the image feature data with the pieces of frame-based image feature data of the video feature data; a corresponding feature point determination unit for determining pairs of corresponding feature points between the image and the one or more frames determined by the candidate selection unit, based on the image feature data of the image and pieces of image feature data of the determined frames; and a reliability estimation unit for estimating reliability of analysis of the correlation between the image and the video based on pieces of feature point orientation information of feature points included in the feature point pairs determined by the corresponding feature point determination unit.

Furthermore, the reliability estimation unit may estimate the reliability of the analysis of the relation between the image and the video, based on a probability density function for estimated values of differences between orientations of the feature points included in the respective feature point pairs.

Furthermore, the probability density function may be used to calculate a mean and a variation of the estimated values, a probability (p) of pairs of feature points being observed may be calculated using a standard normal distribution function based on the mean and the variation, and the calculated probability (p) or a function based on the probability (p) may be compared with a threshold, thus enabling the reliability of the analysis of the correlation between the image and the video to be estimated.

Furthermore, the probability (p) of the pairs of feature points being observed may be calculated by $$p = \prod_{i=1}^{n} G\left(\frac{\hat{d}_i - \hat{d}}{\sigma}\right)$$

(where n denotes a number of pairs of corresponding feature points, G denotes a probability function of a standard normal distribution having a mean of 0 and a standard deviation of 1, and $\hat{d}$ denotes a mean of differences between orientations of all feature point pairs $$(\hat{d} = \frac{1}{n}\sum_{i=1}^{n} \theta(p_i) - \theta(q_i),$$

and $\hat{d}_i$ denotes estimated values of the differences between the orientations of all feature point pairs based on the probability density function).

Furthermore, the image feature data generation unit may include an image feature point determination unit for determining feature points from the image and extracting feature point information of the determined feature points; an image feature point orientation estimation unit for estimating pieces of orientation information for the respective feature points determined by the feature point determination unit; and an image feature data configuration unit for generating binary feature vectors based on the feature point information and the orientation information, for the respective feature points determined by the feature point determination unit, and generating feature data of the image including the generated binary feature vectors, and the video feature data generation unit may include a frame selection unit for extracting, for each video, frames constituting the video at regular time interval, calculating a difference between each extracted frame and one or more previously extracted frames, and selecting the extracted frame when the difference is equal to or greater than a threshold; a frame-based feature point determination unit for determining feature points for the frame selected by the frame selection unit and extracting feature point information of the determined feature points; a frame-based feature point orientation estimation unit for estimating pieces of orientation information for the respective feature points determined by the frame-based feature point determination unit; and a frame-based feature data configuration unit for generating binary feature vectors based on the feature point information and the orientation information, for the respective feature points determined by the frame-based feature point determination unit, and configuring frame-based feature data including the generated binary feature vectors.

Furthermore, the image feature data configuration unit and the frame-based feature data configuration unit may be configured to generate, for the feature points determined by the image feature point determination unit and the frame-based feature point determination unit, surrounding image areas including the respective feature points, align the generated surrounding image areas in an identical orientation based on the orientation information, divide each of aligned surrounding image areas into sub-regions, and generate binary feature vectors based on averages of brightness values of the divided sub-regions.

Furthermore, each binary feature vector may be generated by at least one selected from among difference vectors and double-difference vectors obtained from the averages of brightness values of the sub-regions.

Furthermore, selection of at least one from among the difference vectors and the double-difference vectors obtained from averages of brightness values of the sub-regions may be performed in correspondence with respective bits of the binary feature vector.

Furthermore, a linear combination or a nonlinear combination may be calculated for the difference vectors and the double-difference vectors selected in correspondence with the respective bits, and resulting values of the calculation may be compared with a threshold, thus enabling values of corresponding bits of the binary feature vector to be determined.

Furthermore, alignment may be performed based on a criterion preset for the respective bits of the binary feature vector.

Furthermore, the video feature data generation unit may generate video feature data including a video identifier (ID) for each video, an ID for each frame of the video, coordinates of feature points of each frame, feature point orientation information, and binary feature vectors.

Furthermore, the apparatus may further include a hash generation unit for generating a hash table for pieces of video feature data generated by the video feature data generation unit by using one or more bits of each binary feature vector included in each piece of frame-based feature data as an index of the hash table.

Furthermore, the relation analysis unit may further include a hash search unit for searching the hash table generated by the hash generation unit by using one or more bits of each binary feature vector included in the image feature data as an index, and obtaining pieces of video feature data belonging to the index, and the candidate selection unit may compare the image feature data with the pieces of video feature data obtained by the hash search unit, determine a video corresponding to video feature data having a highest match rate, and determine a frame, corresponding to frame feature data having a highest match rate with the image feature data, from frames constituting the determined video, or compare the image feature data with the pieces of video feature data obtained by the hash search unit and determine a frame corresponding to frame feature data having a highest match rate with the image feature data.

Furthermore, the image feature data generation unit may include an image feature point determination unit for determining feature points from the image and extracting feature point information of the determined feature points; an image feature point orientation estimation unit for estimating pieces of orientation information for the respective feature points determined by the feature point determination unit; and an image feature data configuration unit for generating binary feature vectors based on the feature point information and the orientation information, for the respective feature points determined by the feature point determination unit, and generating feature data of the image including the generated binary feature vectors, and the video feature data generation unit may include a frame selection unit for extracting, for each video, frames constituting the video at regular time intervals, comparing image feature data of each extracted frame with image feature data of previously extracted frames, determining pairs of corresponding feature points, estimating reliability of analysis of correlations between the extracted frame and the previously extracted frames based on feature point orientation information of feature points included in the determined feature point pairs, and selecting the corresponding frame based on results of the estimation; a frame-based feature point determination unit for determining feature points for the frame selected by the frame selection unit and extracting feature point information of the determined feature points; a frame-based feature point orientation estimation unit for estimating pieces of orientation information for the respective feature points determined by the frame-based feature point determination unit; and a frame-based feature data configuration unit for generating binary feature vectors based on the feature point information and the orientation information, for the respective feature points determined by the frame-based feature point determination unit, and configuring frame-based feature data including the generated binary feature vectors.

In accordance with yet another aspect of the present invention, there is provided a method of analyzing a correlation between an image and a video, including a first step of determining feature points of an image and generating image feature data including pieces of feature point orientation information for the respective feature points; a second step of determining, for a video, feature points for one or more frames constituting the video, and generating pieces of frame-based image feature data including pieces of feature point orientation information for the respective frame-based feature points, thus generating video feature data; and a third step of comparing the image feature data with the video feature data and then analyzing a correlation between the image and the video, wherein the third step includes the steps of 3-1) determining a matching video by comparing the image feature data with the pieces of frame-based image feature data of the video feature data, and determining one or more of frames constituting the determined video, or for determining one or more matching frames by comparing the image feature data with the pieces of frame-based image feature data of the video feature data; 3-2) determining pairs of corresponding feature points between the image and the one or more frames determined at 3-1), based on the image feature data and pieces of image feature data of the determined frames; and 3-3) estimating reliability of analysis of the correlation between the image and the video based on pieces of feature point orientation information of feature points included in the feature point pairs determined at 3-2).

Advantageous Effects

In accordance with the present invention, there can be provided an apparatus and method that can promptly and efficiently analyze correlations indicating whether identicalness is present between images or between an image and a video, or which video an image is included in, and which frame of a video an image corresponds to.

Further, in accordance with the present invention, there can be provided an apparatus and method that can more conveniently and efficiently generate feature data indicating the features of images and videos compared to a conventional method, and that can rapidly perform the analysis of correlations, such as the comparison and search regarding whether identicalness is present between an image and another image or between an image and a video, using the feature data within a very short time.

Furthermore, in accordance with the present invention, reliability is determined based on a probability function upon comparing an image with another image or comparing an image with a video, thus improving the reliability of comparison and search and also providing probabilistic values for the results of comparison and search.

Furthermore, in accordance with the present invention, there is an advantage in that it is possible to promptly and efficiently determine pieces of information about whether identicalness is present between images, which video an image belongs to, and which frame of a video an image is located at, by comparing an image with another image or comparing an image with a video. Furthermore, similarity can be determined with high reliability even when only a part of an image is provided, or even when an image is included in another image or a video.

Furthermore, in accordance with the present invention, feature data of an image can be implemented using a smaller number of feature points and simpler feature vectors compared to a conventional method, so that operation time can be shortened and task efficiency can be greatly improved. Furthermore, there is an advantage in that a feature vector set for only frames from which an overlap is removed can be obtained even for frames in a video in which parts of images frequently overlap. In addition, there is an advantage in that orientation information of feature points is used, and thus similarity can be estimated with high reliability using a smaller number of feature points compared to existing methods.

Furthermore, in accordance with the present invention, feature points of images or videos and pieces of information such as orientation information and size information of the feature points, are together taken into consideration, so that the presence of identicalness can be detected even when a source video or image is rotated, enlarged, or reduced. In addition, the present invention considers together a plurality of feature points included in an image, so that, even when a plurality of videos or images are included together in a single image, a source video and/or a frame or a source image, in which a query target image is included, can be detected.

BEST MODE

Hereinafter, embodiments of the present invention will be described in detail with reference to the attached drawings.

Figure 1:
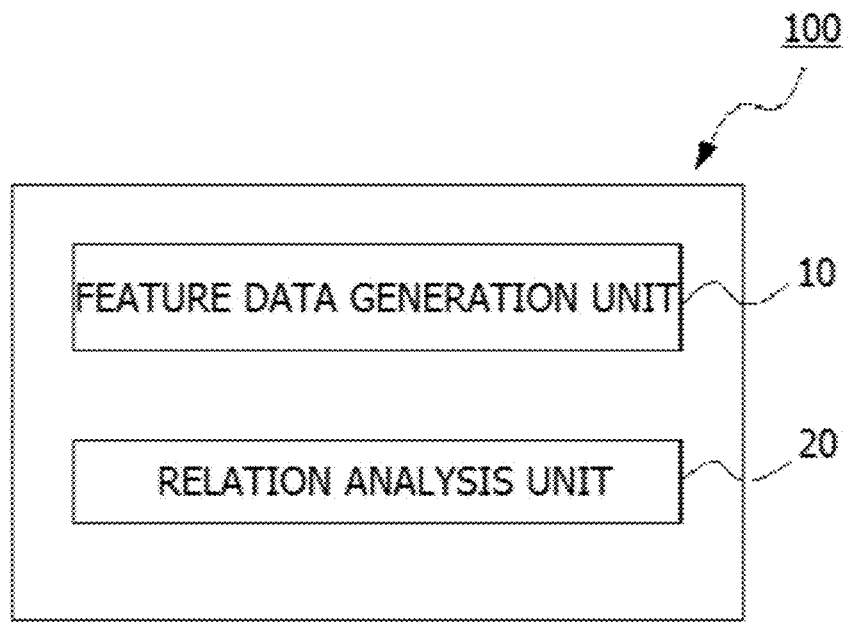
FIG. 1 is a block diagram showing the configuration of an apparatus for analyzing a correlation between images according to an embodiment of the present invention.

FIG. 1 is a block diagram showing the configuration of an apparatus for analyzing a correlation between images according to an embodiment of the present invention.

Referring to FIG. 1, an apparatus 100 for analyzing a correlation between images (hereinafter referred to as a 'correlation analysis apparatus') according to the present embodiment includes a feature data generation unit 10 and a relation analysis unit 20, and functions to generate feature data of each image using the components and to promptly and efficiently analyze a correlation between images, for example, a correlation indicating whether identicalness is present between the images to be compared, using the above components. In this case, the term 'identicalness' includes not only a case where images to be compared are completely identical to each other in all aspects of features of the images, but also cases where those images are transformed due to changes in size, the number of pixels, color, rotation, and scale. For example, when the size of an image is reduced by to half, when the color of an image is changed, and when an image is rotated at an angle of 30° clockwise, it is determined that the images have identicalness even if they are not completely identical.

The feature data generation unit 10 functions to determine feature points of each image and generate feature data including pieces of feature point orientation information for the respective feature points. The relation analysis unit 20 functions to analyze a correlation between images using the feature data generated by the feature data generation unit 10.

The feature data generation unit 10 functions to determine feature points of each image, and generate feature data including pieces of feature point orientation information for the determined feature points. As described above, various schemes have been proposed in the prior art as methods of determining feature points of images, extracting orientation information for the determined feature points, and configuring feature data including the orientation information. In the embodiment of FIG. 1, the feature data generation unit 10 may use the methods known in the prior art without change. That is, the embodiment of FIG. 1 is characterized in that as long as feature points are determined and feature data including the orientation information of the feature points is generated regardless of which type of scheme is used, the relation analysis unit 20 analyzes a correlation between images, that is, a correlation indicating whether identicalness is present between images, using the feature data. In other words, the relation analysis unit 20 is not dependent upon the detailed configuration of the feature data generation unit 10.

Meanwhile, an image feature data generation method disclosed in Korean Patent Application No. 10-2011-0012741 filed by the present applicant may be applied to the feature data generation unit 10. This will be described later as a separate embodiment with reference to FIG. 3 and subsequent drawings. Therefore, in the embodiment of FIG. 1, a detailed description of the detailed configuration of the feature data generation unit 10 will omitted, and only a method of analyzing a relation between images through the relation analysis unit 20 by using the feature data generated by the feature data generation unit 10 will be described first.

Figure 2:
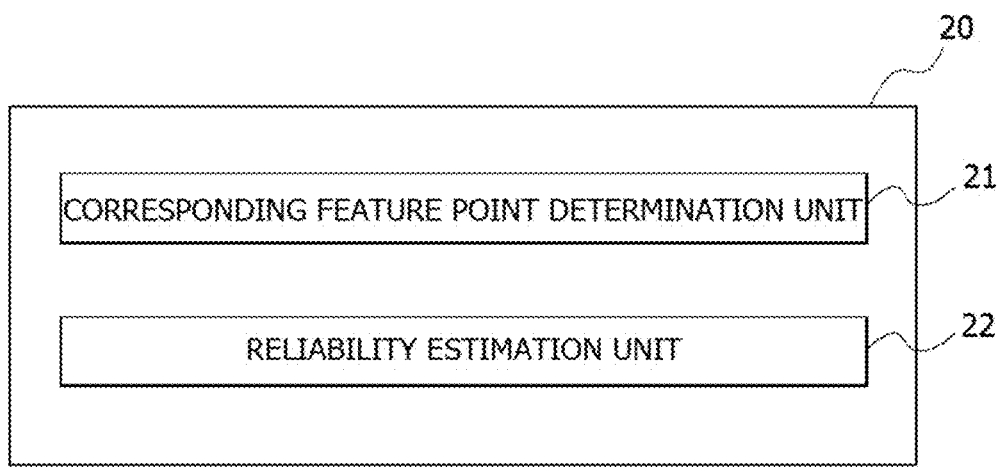
FIG. 2 is a diagram showing the internal configuration of a relation analysis unit 20.

FIG. 2 is a diagram showing the internal configuration of the relation analysis unit 20. Referring to FIG. 2, the relation analysis unit 20 includes a corresponding feature point determination unit 21 and a reliability estimation unit 22.

The corresponding feature point determination unit 21 functions to determine pairs of corresponding feature points between images to be compared, and the reliability estimation unit 22 functions to estimate matching reliability, that is, the reliability of analysis of a correlation based on the feature point orientation information of the feature points included in the pairs of feature points determined by the corresponding feature point determination unit 21.

The corresponding feature point determination unit 21 determines pairs of corresponding feature points between images to be compared using the feature data generated by the feature data generation unit 10. This determination may be performed by, for example, calculating a distance between pieces of feature data, as is well known in the prior art. That is, a function, such as a Hamming distance or a Euclidean distance, is applied to the feature data of each of the feature points of two images to be compared, and a difference between distances is calculated, so that if a distance difference is equal to or less than a predetermined threshold, the corresponding feature points may be determined to be a pair of corresponding feature points. Here, a RANdom Sample Consensus (RANSAC) algorithm widely known in the prior art may also be used. Meanwhile, a transformation matrix between the coordinates of images may be a combination of a typical homography transformation and special cases thereof, that is, rotation, parallel translation, and scaling. In this way, the corresponding feature point determination unit 21 may determine a set of pairs of corresponding feature points using a method of calculating values, such as a distance function of same type of feature data to be compared (regardless of which feature data is used). As described above, the corresponding feature point determination unit 21 may use the method known in the prior art, without change, and this is not a component directly related to the present invention, and thus a detailed description thereof will be omitted.

Meanwhile, as described above, the reliability estimation unit 22 estimates the reliability of analysis of the relation between images, based on the feature point orientation information of feature points included in the feature point pairs determined by the corresponding feature point determination unit 21, and this estimation may be performed using the following method.

First, it is assumed that pairs of corresponding feature points between two images to be compared are $(p_1, q_1), \ldots, (p_n, q_n)$, and orientations of the respective feature points are defined as $\theta(p_1), \theta(q_1), \ldots$ (here, sets of pairs of corresponding feature points have been determined by the above-described corresponding feature point determination unit 21).

If the two images are identical images and do not undergo excessive transformation, an estimated value $\hat{d}_i = \theta(p_i) - \theta(q_i)$ which is a difference between the orientations of feature points must be a uniform value (a rotational transformation angle between the two images) for all corresponding feature point pairs. Since a true value is assumed to be 'd' and a random error may occur upon estimating an angle, the orientation difference is modeled based on a probability density function, and thereafter the probability of pairs of feature points being observed may be obtained using the mean and variance of the modeled results. As the probability density function, a normal distribution having a mean of 0 and a standard deviation of σ may be used. In this case, the orientation difference may be modeled to $\hat{d}_i \sim N(d, \sigma^2)$ (a normal distribution having a mean of d and a variance of $\sigma^2$).

Actually, since the true value d is not known, $$\hat{d} = \frac{1}{n}\sum_{i=1}^{n} \theta(p_i) - \theta(q_i)$$

is obtained if d is estimated using n feature point pairs. Then, the probability p of the feature point pairs $(p_1, q_1), \ldots, (p_n, q_n)$ being observed may be represented by $$p = \prod_{i=1}^{n} G\left(\frac{\hat{d}_i - \hat{d}}{\sigma}\right),$$

where G denotes a probability function of standard normal distribution having a mean of 0 and a standard deviation of 1. If the value p obtained in this way or a function of the value p, for example, the value of log(p), is used as detection reliability and is compared with a preset threshold $T_m$, the reliability of analysis of the correlation between images may be estimated.

Through this procedure, the reliability estimation unit 22 may estimate the reliability of matching between the feature point pairs determined by the corresponding feature point determination unit 21, that is, the reliability of analysis of the correlation, and may finally determine that two images match each other, that is, have identicalness, only when the estimated reliability is equal to or greater than the threshold. Further, it is apparent that whether identicalness is present between images to be compared may be probabilistically provided while the probability value p itself is provided.

In accordance with this configuration, the reliability of matching between the pairs of corresponding feature points is estimated based on the orientation information of the feature points, so that reliability may be stably estimated even when a much smaller number of feature points are used compared to the prior art, thus consequently enabling processing to be promptly performed without deteriorating precision.

Figure 3:
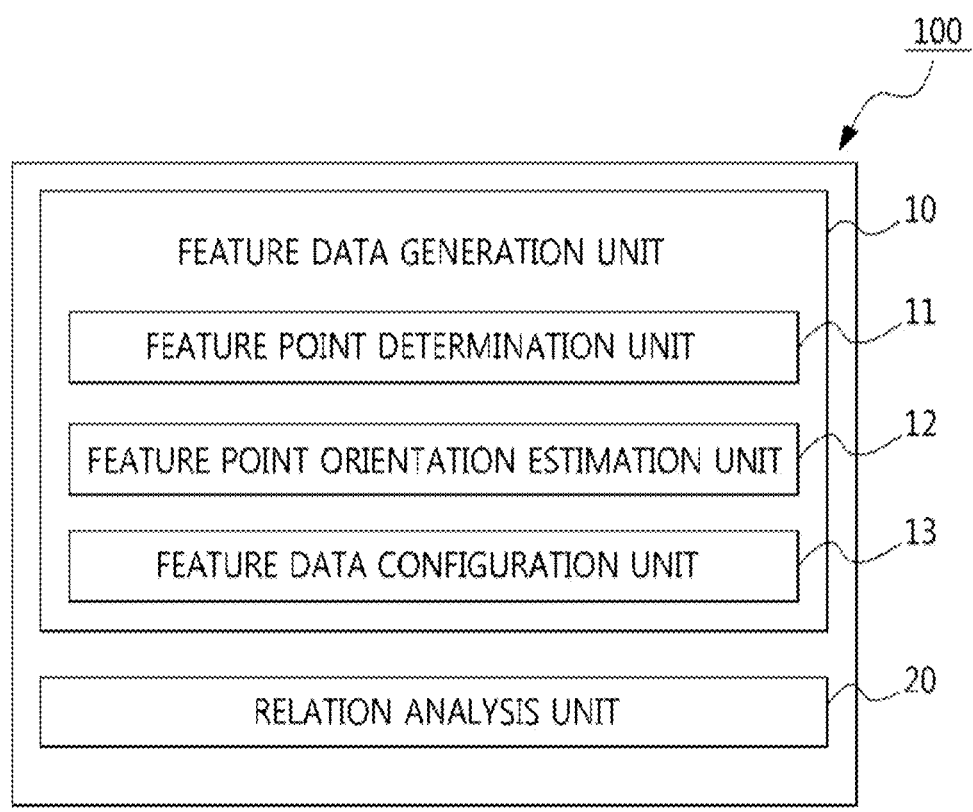
FIG. 3 is a block diagram showing the configuration of an apparatus for analyzing a correlation between images according to another embodiment of the present invention.

FIG. 3 is a block diagram showing the configuration of an apparatus for analyzing a correlation between images according to another embodiment of the present invention.

The embodiment of FIG. 3 is different from the embodiment of FIG. 1 in the detailed configuration of the feature data generation unit 10. As described above, in the embodiment of FIG. 1, the configuration of the feature data generation unit 10 is not especially limited, but an image feature data generation method disclosed in Korean Patent Application No. 10-2011-0012741 filed by the present applicant may be applied to the feature data generation unit 10. The embodiment of FIG. 3 shows a case where the image data generation method disclosed in the above patent application filed by the present applicant is applied to the feature data generation unit 10. In the embodiment of FIG. 3, a relation analysis unit 20 is identical to that described with reference to FIGS. 1 and 2, and thus a detailed description thereof will be omitted.

Referring to FIG. 3, the feature data generation unit 10 includes a feature point determination unit 11, a feature point orientation estimation unit 12, and a feature data configuration unit 13.

A feature point determination unit 11 functions to determine feature points from each image and extract feature point information of the determined feature points. Here, the image refers to still image data and denotes, for example, digital data represented by a file format such as jpg, bmp, or tif. Further, as described above in the field "Background art," features points (or interest points) of an image denote points capable of desirably describing the features of the image compared to other points of the corresponding image, and points that can always be uniformly detected in the image regardless of changes in scaling, rotation, and observation angle are generally determined to be feature points.

The feature point determination unit 11 may use a feature point extraction/determination method well known in the prior art without change. For example, a method using maximum/minimum values of the scale space of a Laplacian of Gaussian (LoG) filter or a Difference of Gaussians (DoG) filter, a method well known in the prior art using a determinant of a Hessian matrix, or the like is used, and then points that can be feature points in the given image can be determined. Meanwhile, a Scale-Invariant Feature Transform (SIFT) algorithm disclosed in U.S. Pat. No. 6,711,293 (by David G. Lowe), a Speed Up Robust Features (SURF) algorithm (by H. Bay, T. Tuytelaars and L. van Gool (2006), "SURF: Speeded Up Robust Features", Proceedings of the 9th European Conference on Computer Vision, Springer LNCS volume 3951, part 1. pp. 404~417), or the like presents the entire process for generating feature vectors including the extraction/determination of feature points of an image, and the image feature point extraction/determination method disclosed in the process may also be used. That is, the feature point determination unit 11 of the present invention may use all types of feature point extraction/determination methods known in the prior art, but this is not a core part the present invention, and thus a detailed description thereof will be omitted.

Meanwhile, as described above, at the same time that the feature point determination unit 11 finds the feature points of an image, it also extracts other types of feature point information, such as the intensities or sizes of the feature points related to the feature points. Since the type and detailed content of feature point information may differ according to the feature point extraction/determination method that is used, they are selectively extracted according to the data used in a post-processing procedure, such as image matching, object tracking, and image comparison. A method of extracting such feature point information may also be implemented as methods well known in the prior art.

The intensities of feature points may vary according to the feature point extraction/determination method that is used. For example, when a Laplacian of Gaussian (LoG) filter is used, a Laplacian operator may be used as the intensity of each feature point. When the convolution of a given image f(x, y) and a Gaussian kernel $$g(x, y, t) = \frac{1}{\sqrt{2\pi t}} e^{-(x^2+y^2)/(2t)}$$

is performed for a predetermined scale t, a LoG scale space may be represented by L(x, y, t)=g(x, y, t)*f(x, y), and in this case, the Laplacian operator $\nabla^2 L=L_{xx}+L_{yy}$ may be calculated. Since the resulting values of the Laplacian operator individually exhibit large values in a dark point (blob) and a bright point (blob) among the points of the image, they may be data required to basically determine whether the corresponding image can be used for feature points. Depending on the magnitudes of the values, the resulting values may be used as indices indicating the intensities of feature points.

Meanwhile, similarly, even when a Difference of Gaussian (DoG) filter is used, the resulting values of a Laplacian operator can be used as the intensities of feature points. Further, when a Hessian matrix is used, values of the determinant of the Hessian matrix can be used as the intensities of feature points. In this way, the intensities of feature points may be implemented using information based on discriminants used to extract/determine feature points of an image according to the prior art.

Meanwhile, the size of the feature point of an image denotes information about an area occupied by the corresponding feature point in the image, and may be represented by, for example, the length of each side in the case of a rectangle, the length of a radius in the case of a circle, etc. The size of a feature point may also be obtained by a method used in the prior art. For example, when the above-described Laplacian of Gaussian (LOG) filter is used, a value such as the k multiple of a scale t (or t̂) indicating the maximum intensity of the feature point (where k is any constant, such as 4 or 6) may be used.

Referring back to FIG. 3, a feature point orientation estimation unit 12 performs the function of estimating pieces of orientation information for respective feature points determined by the feature point determination unit 11. This may be implemented using various gradient-based methods well known in the prior art. For example, for all points present in the predetermined surrounding area of each feature point, surrounding gradients of each point are calculated and the orientations of the gradients are averaged, and thus the orientation information of the feature point may be estimated. In accordance with this method, even when a feature point undergoes arbitrary rotational transformation, the original orientation may be estimated. A method of estimating the orientations of feature points using the feature point orientation estimation unit 12 may also be implemented using methods well known in the prior art, and is not a component directly related to the present embodiment, and thus a detailed description thereof will be omitted.

The feature data configuration unit 13 functions to generate, for the respective feature points determined by the feature point determination unit 11, binary feature vectors based on the feature point information and the orientation information estimated by the feature point orientation estimation unit 12, and configure feature data of the image including generated binary feature vectors. Here, the term "feature data" generally denotes data (descriptor) describing information related to feature points extracted/determined for a given image, and the feature data configuration unit 13 generates such feature data in the form of binary feature vectors. In this case, the feature point information is extracted and obtained by the feature point determination unit 11, and the orientation information is obtained by the above-described feature point orientation estimation unit 12.

The feature data configuration unit 13 may generate binary feature vectors so that feature data may be generated using a relatively small amount of data while desirably representing the features of the corresponding feature point at the same time that the relation analysis unit 20 may perform prompt processing using the feature data, and may configure feature data including the binary feature vectors. Such a binary feature vector must not deteriorate features unique to a feature point while maintaining robustness to each feature point.

Figure 4:
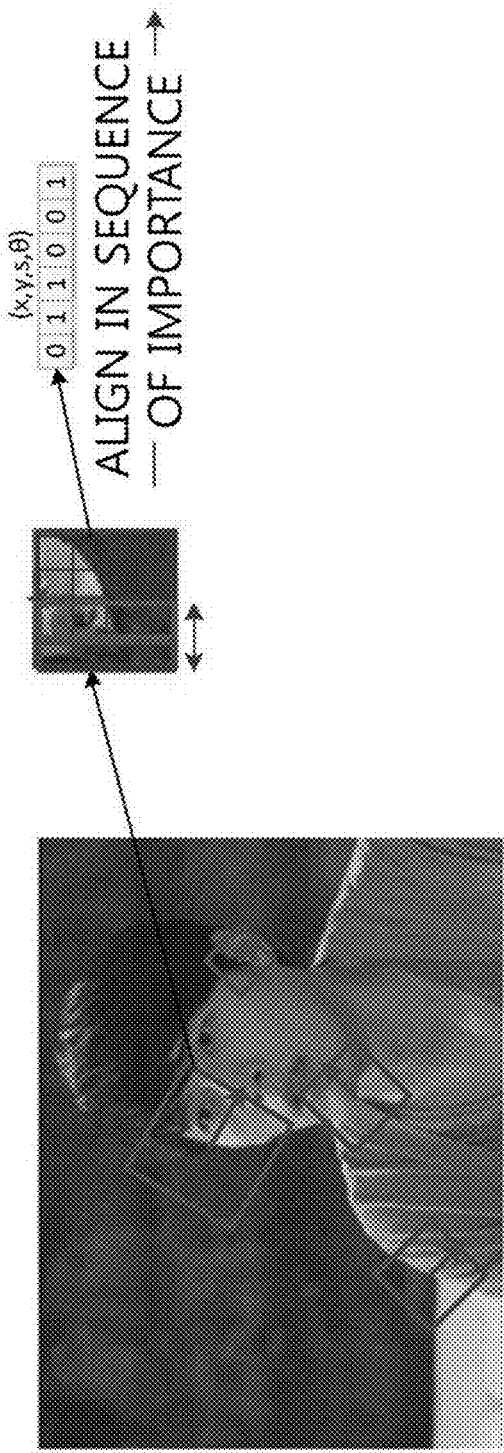
FIG. 4 illustrates a screen showing an actual example of a process for generating a binary feature vector.

A process for generating a binary feature vector using the feature data configuration unit 13 will be described with reference to FIGS. 4 and 5. FIG. 4 illustrates a screen showing an actual example of a process for generating a binary feature vector, and FIG. 5 is a flowchart showing the process for generating a binary feature vector.

Figure 5:
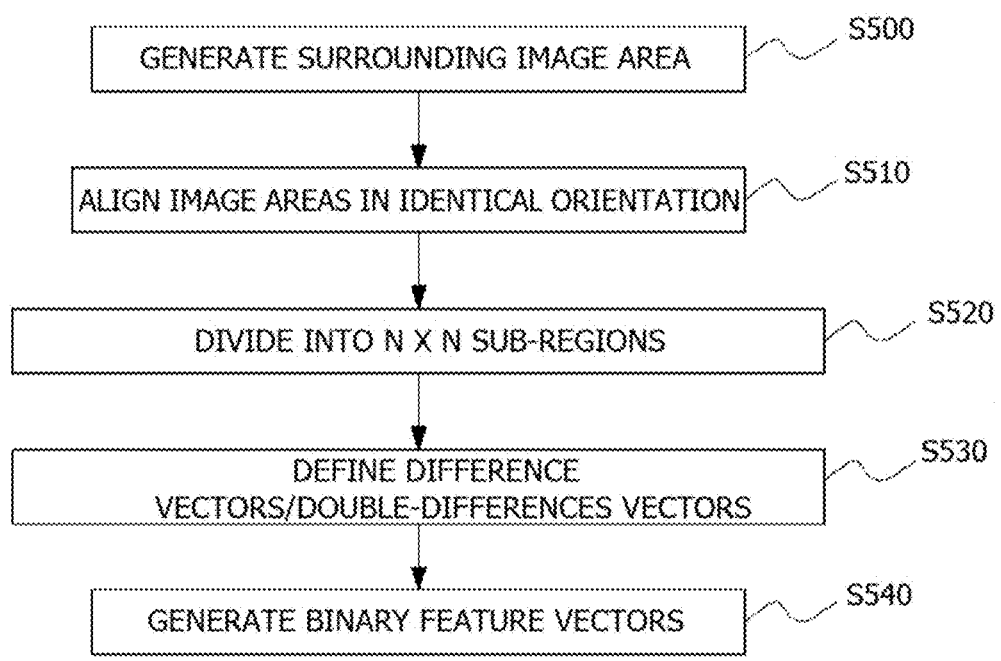
FIG. 5 is a flowchart showing the process for generating a binary feature vector.

Referring to FIGS. 4 and 5, for the feature points determined through the above-described process, surrounding image areas including the respective feature points are generated in the form of, for example, a rectangular shape using the size and orientation information of the feature points, and the surrounding image areas are aligned in the same orientation (S500, S510). In this case, the generation of the surrounding image area including the corresponding feature point in the form of a rectangular shape may be performed using size information included in the feature point information extracted by the feature point determination unit 11. For example, the rectangular surrounding image area may be generated by using information such as the length of one side (in the case of a square), the lengths of horizontal and vertical sides (in the case of a rectangle), or a radius (in the case of a circle), as the size information. For example, when the length of one side is given, a square based on the length of the corresponding side may be generated, and when the lengths of horizontal and vertical sides are given, a square having a larger or smaller of the values as the length of each side may be generated. Further, when a radius is given, a square having the radius as the length of each side may be generated. Furthermore, the reason for aligning the generated surrounding image areas in the same orientation is to obtain the same feature vector even if a target image is a rotated form of another image. Meanwhile, when a surrounding image area including a feature point is generated, a method of generating the surrounding image area in a rectangular shape based on coordinates within a preset size, for example, a range of ±10 around the feature point, rather than based on the size information of the feature point, may be implemented.

Next, each of the generated and aligned image areas is divided into N×N sub-regions, as shown in the right portion of FIG. 4 (S520). N×N values obtained by averaging the image brightness values of respective sub-regions are assumed to be I(i), i=1, 2, . . . , $N^2$, and brightness difference vectors and brightness double-difference vectors are defined by the following equations (S530).

Difference vector: $D(i,j)=I(i)-I(j), i,j=1,2,\ldots,N^2$

Double-difference vector: $E(i,j,k,l)=D(i,j)-D(k,l) i,j,k,l=1,2,\ldots,N^2$

Next, the feature data configuration unit 13 selects one or more of the difference vectors D(i, j) and the double-difference vectors E(i, j, k, l) defined by the above equations, and generates a binary feature vector based on the selected vectors (S540).

Figure 6:
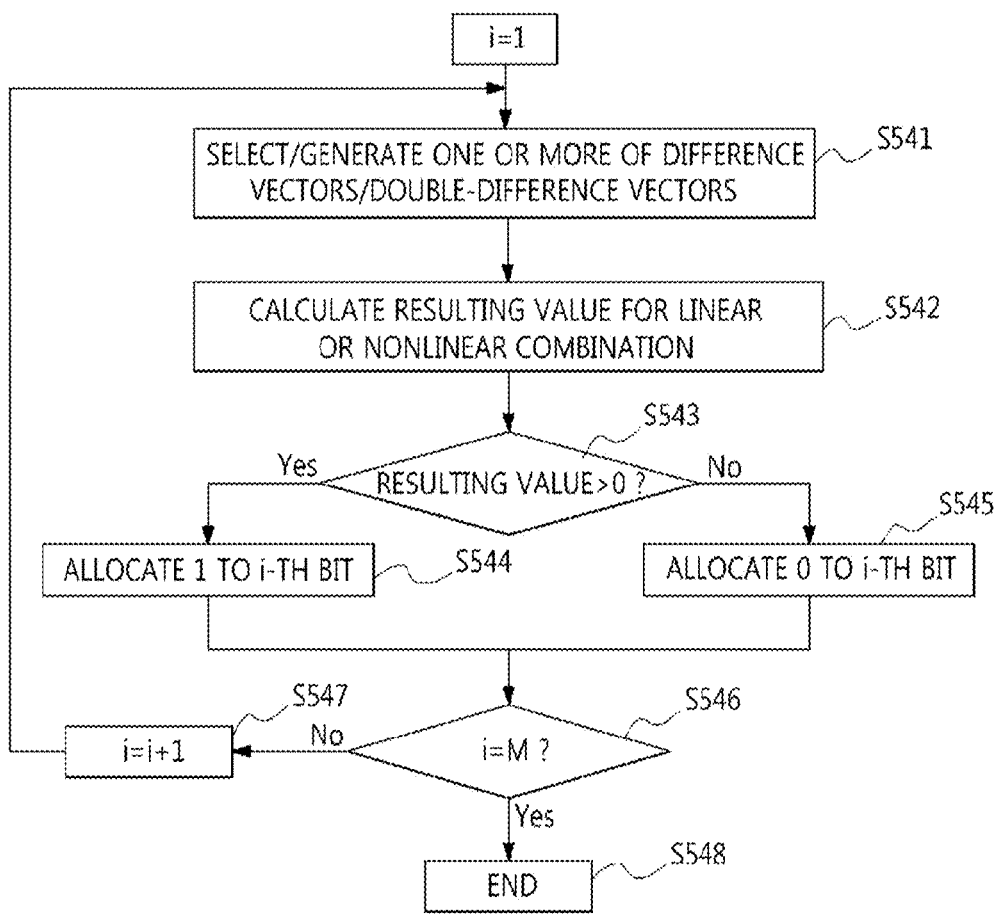
FIG. 6 is a diagram showing an example of a detailed process for generating a binary feature vector based on a difference vector and a double-difference vector.

An example of a detailed process for generating a binary feature vector based on the difference vectors and the double-difference vectors is shown in FIG. 6.

The example of FIG. 6 relates to a case where a binary feature vector is composed of M bits, wherein the process of FIG. 6 is repeated M times. For this, i=1 is initially set, one or more of difference vectors and double-difference vectors defined for a given feature point are selected, and the difference vectors and the double-difference vectors are generated based on the defined equations (S541). Which of the defined difference vectors and double-difference vectors are to be selected may be previously set. For example, binary feature vectors are previously generated through a plurality of sample images, and which of difference vectors and double-difference vectors must be selected so as to exhibit robust characteristics regardless of changes in images is determined based on the statistical values of the binary feature vectors, and thus the corresponding vectors conforming to such a criterion may be selected. Further, vectors may be selected only from among difference vectors or double-difference vectors. Furthermore, the number of difference vectors to be selected and the number of double-difference vectors to be selected may also vary depending on circumstances. For example, it is possible to select three difference vectors and two double-difference vectors, or to select two difference vectors and three double-difference vectors.

In addition, the selection and generation of at least one of difference vectors and double-difference vectors must be performed M times corresponding to the number of bits of each binary feature vector, but sets of selected difference vectors and double-difference vectors must differ, and thus it is preferable to preset sets of different difference vectors and different double-difference vectors so that different sets of difference vectors and double-difference vectors are selected each time.

Next, linear combinations are calculated for the selected and generated difference vectors and double-difference vectors (S542). For example, when the number of selected and generated difference vectors is four, that is, D(1,2), D(3,4), E(1,2,4,5), and E(3,5,6,7), linear combinations are calculated for the respective values of the difference vectors (these values have difference values and double-difference values of average brightness values, as described above). That is, in the case of linear combinations, a linear combination represented by, for example, aD(1,2)+bD(3,4)+cE(1,2,4,5)+dE(3,5,6,7), can be calculated (where a, b, c, and d denote arbitrary coefficients). For example, when five difference vectors and five double-difference vectors are present, the space of linear combinations thereof may be actually infinite, and specific combinations enabling the corresponding feature point to be easily distinguished from other feature points are present in the space. Such specific combinations are previously tested and determined through a plurality of sample images, and which linear combination is to be performed may be determined based on the statistical estimation of the test results. Meanwhile, it is apparent that nonlinear combinations including a nonlinear operation, such as a multiplication, as well as linear combinations, may be performed at step S542, and it is also possible to mix and use linear combinations and nonlinear combinations depending on the circumstances.

If the above process has been performed, a resulting value thereof may be obtained. It is determined whether the resulting value is greater than a predetermined threshold, for example, 0 (S543). If the resulting value is greater than 0, 1 is allocated to the corresponding bit, that is, an i-th bit (S544), whereas if the resulting value is less than 0, 0 is allocated to the corresponding bit, that is, the i-th bit (S545). In this way, the i-th bit value of the binary feature vector is determined.

Next, it is determined whether i=M (that is, whether a bit is a last bit) (S546). If the bit is not a last bit, i is increased (S547), and steps S541 to S547 are repeated, whereas if the bit is the last bit, the process is terminated (S548).

If the process of FIG. 6 has been completed, the binary feature vector composed of M bits, each represented by 0 or 1, is generated for the given feature point. The binary feature vector shown in the right portion of FIG. 4 is generated through the above process, and it can be seen that the binary feature vector is composed of a total of 6 bits, each being allocated 0 or 1.

Meanwhile, after the binary feature vector has been generated, an alignment procedure may be further performed on respective bits based on the importance thereof. Among linear or nonlinear combinations of difference vectors and double-difference vectors, a combination that is more robust to changes in scaling, size, or angle than any other combinations may be present. A combination having such robustness is tested and determined through a plurality of sample images, and a procedure for aligning binary feature vectors depending on the sequence thereof, that is, the sequence of robustness, may be performed using the combination. That is, if the process of FIG. 6 is performed, when values of M bits are represented by "001010," the bit values may be aligned as "011001" depending on the importance, and such a binary feature vector is shown in the right portion of FIG. 4. In this way, when the binary feature vectors are aligned in the sequence of importance, there is an advantage in that the comparison and searching of data may be promptly processed based on the importance in a post-processing procedure.

Via the above process, if the binary feature vectors have been generated for respective feature points, the feature data configuration unit 13 finally generates feature data of the image, including those binary feature vectors and other pieces of feature point information about the feature points. The other pieces of feature point information included in the feature data may include one or more of, for example, the x coordinate value, y coordinate value, size information, and orientation information of each feature point. The other pieces of feature point information may be configured to include all of the pieces of information, or to select only some of the pieces of information, and this configuration may be set differently depending on the conditions in the procedure of processing by the relation analysis unit 20. For example, when the other pieces of feature point information may be configured to include all of the above-described feature point information, the finally generated feature data may be a set of feature points, each composed of (x coordinate value, y coordinate value, size, orientation, binary feature vector). A binary number shown in the right portion of FIG. 4 denotes the binary feature vector of the corresponding feature point, and (x, y, s, θ) indicated over the binary number respectively denote (x coordinate value, y coordinate value, size, orientation). Of course, when size information is not required in the post-processing procedure, feature data may also be configured using only the remaining information other than size information.

Meanwhile, in the embodiments shown in FIGS. 4 to 6, a case where difference vectors and double-difference vectors for average values of brightness values of sub-regions are defined (S530 of FIG. 5), and one or more of the difference vectors and the double-difference vectors are selected based on the above-described criterion, and where linear or nonlinear combinations of the selected difference vectors and double-difference vectors are generated and then binary feature vectors are generated, has been described. However, it is also possible to implement an embodiment in which difference vectors and double-difference vectors are previously generated for all of the averages of brightness values of the sub-regions. In this case, difference vectors and double-difference vectors are generated for the averages of brightness values of all the sub-regions at step S530 of FIG. 5, and only a procedure for selecting vectors from among the generated difference vectors and double-difference vectors based on the above-described criterion is performed at step S541 of FIG. 6. That is, the procedure for calculating and generating difference vectors and double-difference vectors may be omitted at step S541.

If the process shown in FIGS. 4 to 6 has been performed, the feature data of the image including the binary feature vectors is finally generated. The relation analysis unit 20 analyzes a correlation between images using the feature data of each image through the process described in FIGS. 1 and 2.

Figure 7:
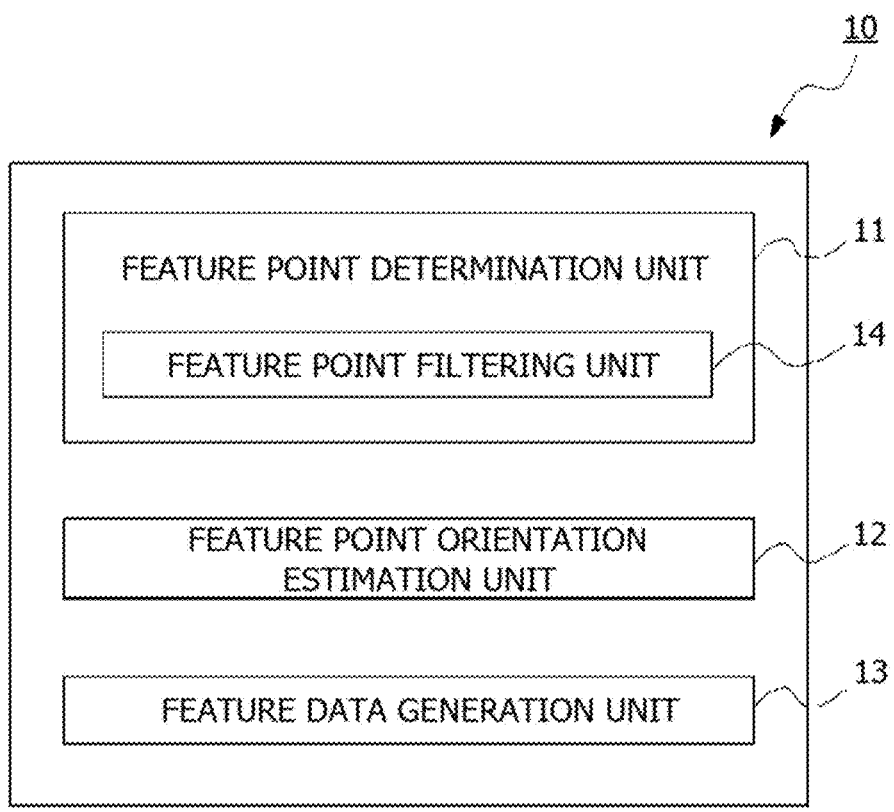
FIG. 7 is a diagram showing another embodiment of a feature data generation unit 10.

FIG. 7 is a diagram showing another embodiment of the feature data generation unit 10.

The feature data generation unit 10 in the embodiment of FIG. 7 is different from the feature data generation unit 10 of FIG. 3 in that a feature point filtering unit 14 is further included in the feature point determination unit 11.

The feature point filtering unit 14 performs the function of determining one or more of the feature points determined by the feature point determination unit 11 to be final feature points. For this, as described above, the feature point determination unit 11 may determine points having higher intensities than those of points located in the surrounding area of each feature point to be final feature points, based on the intensities of feature points extracted as feature point information. Since the number of feature points determined by the feature point determination unit 11 may typically range from a minimum of several tens to a maximum of several thousands or several tens of thousands per, there is a need to sort feature points having clearer features than those of other feature points, from a plurality of feature points, in order to perform large-capacity and high-speed processing. The feature point filtering unit 14 functions to sort feature points having clearer and more definite features than other feature points from the feature points determined by the feature point determination unit 11, and select the sorted feature points as the final feature points. That is, the feature point filtering unit 14 functions to reduce the number of feature points.

The feature point filtering unit 14 may sort(select) feature points using the following method. For example, for an image having a size of W×H, when the intensity of an i-th point of feature points $c_1, c_2, \ldots, c_N$ determined by the feature point determination unit 11 is $f(c_i)$, and a set of points belonging to the surrounding area of each point, for example, an area within a radius of min(W,H)/10, is $R_1(c_i)$, whether the point $c_i$ can be finally selected as a feature point may be determined by first searching for relatively important points $R_2(c_i)$ around the corresponding point using the equation $$R_2(c_i) = \left\{ c_i \mid f(c_i) > \max_{R_1(c_i)} [f(c_i)] \times T_1 \right\},$$

and then determining feature points satisfying the following expression defined using the found feature points to be final feature points, $$f(c_i) > \frac{\sum_{c_i \in R_2(c_i)} f(c_i)}{\#(R_2(c_i))} \times T_2$$

where # denotes an operator for obtaining the size of a set, and $T_1$ and $T_2$ denote thresholds that can be optimized. If the above expression is used, neighboring important points $R_2(c_i)$ around any feature point are found, and the corresponding feature point may be finally selected as the feature point when the intensity of the corresponding feature point is relatively greater than those of the neighboring important points using the intensities of the important points. That is, even for an image having a locally large variation or an image having complicated texture, a small number of feature points desirably representing the entire area may be stably sorted, and the number of feature points determined by the feature point determination unit 11 may be reduced to several tens from several hundreds. Here, as described above with reference to the feature point determination unit 11, values obtained from the expression required to determine whether corresponding points are feature points in the algorithm used by the feature point determination unit 11, as in the case of a Laplacian operator, may be used as intensities.

Figure 8:
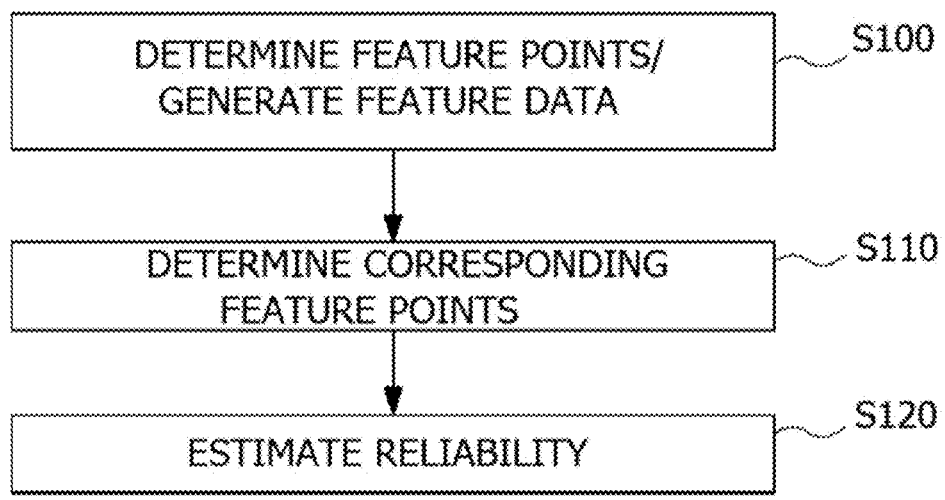
FIG. 8 is a flowchart showing a method of analyzing a correlation between images, which is performed by a correlation analysis apparatus 100 described with reference to FIGS. 1 to 7.

FIG. 8 is a flowchart showing an embodiment of a method of analyzing a correlation between images, which is performed by the correlation analysis apparatus 100 described above with reference to FIGS. 1 to 7.

Referring to FIG. 8, the feature data generation unit 10 first determines feature points of each image, and generates feature data including feature point orientation information for each of the determined feature points (S100).

Next, the relation analysis unit 20 analyzes a correlation between images using the feature data generated by the feature data generation unit 10, and this step includes the step S110 of the corresponding feature point determination unit 21 determining pairs of corresponding feature points between the images to be compared using the feature data generated by the feature data generation unit 10 and the step S120 of the reliability estimation unit 22 estimating the reliability of analysis of the relation between the images based on the feature point orientation information of the feature points included in the feature point pairs determined by the corresponding feature point determination unit 21. The respective steps S100 to S120 have been described with reference to FIGS. 1 to 7, and thus a detailed description thereof will be omitted.

Figure 9:
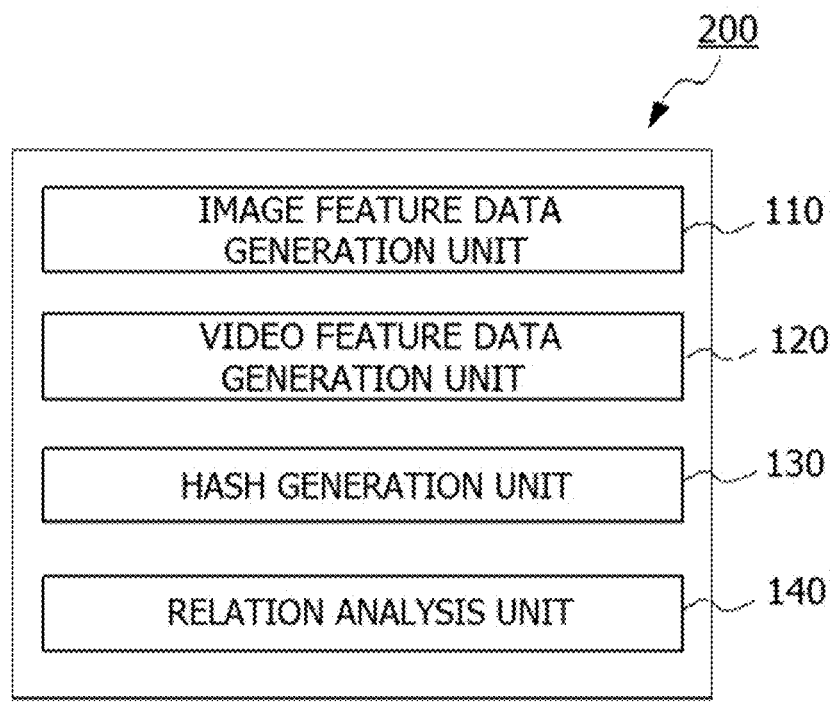
FIG. 9 is a block diagram showing the configuration of an apparatus for analyzing a correlation between an image and a video according to an embodiment of the present invention.

FIG. 9 is a block diagram showing the configuration of an apparatus for analyzing a correlation between an image and a video according to an embodiment of the present invention.

An apparatus 200 for analyzing a correlation between an image and a video according to the embodiment of FIG. 9 includes an image feature data generation unit 110, a video feature data generation unit 120, a hash generation unit 130, and a relation analysis unit 140, and analyzes a correlation between the image and the video by means of the above configuration. The embodiment of FIG. 9 is different from the embodiment described with reference to FIGS. 1 to 8 in that the embodiment of FIGS. 1 to 8 compares an image with another image, whereas the embodiment of FIG. 9 analyzes a correlation between an image and a video.

Referring to FIG. 9, the image feature data generation unit 110 functions to determine feature points of an image and generate image feature data including pieces of feature point orientation information for the respective feature points, and is identical to the feature data generation unit 10 in the embodiment of FIGS. 1 to 8, and thus a detailed description thereof will be omitted.

The video feature data generation unit 120 functions to determine, for a video, feature points for one or more of frames constituting the video, and generate pieces of frame-based image feature data including pieces of feature point orientation information for the respective determined frame-based feature points, thus generating video feature data.

Figure 10:
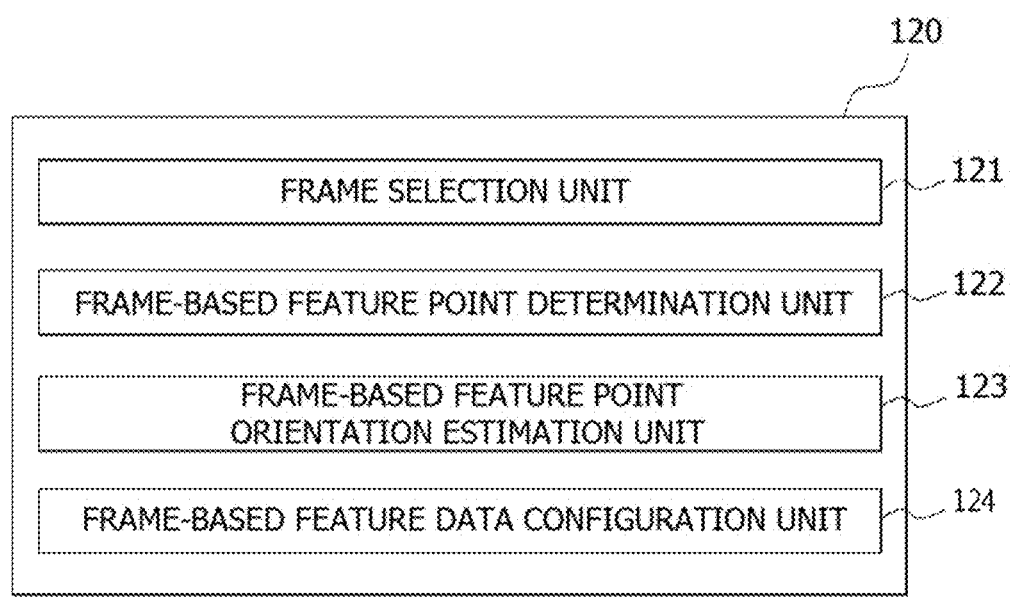
FIG. 10 is a diagram showing an example of the configuration of a video feature data generation unit 120.

FIG. 10 is a diagram showing an example of the configuration of the video feature data generation unit 120. Referring to FIG. 10, the video feature data generation unit 120 may include a frame selection unit 121, a frame-based feature point determination unit 122, a frame-based feature point orientation estimation unit 123 and a frame-based feature data configuration unit 124.

A frame selection unit 121 functions to extract, for each video, frames constituting the video at regular time intervals, calculate a difference between each extracted frame and one or more previously extracted frames, and select the corresponding extracted frame when the difference is equal to or greater than a threshold. That is, the frame selection unit 121 extracts frames from each video at regular time intervals, and calculates a difference between the corresponding extracted frame and one or more of the previously extracted frames. In this case, the previously extracted frames may just be a previous frame, or a predetermined number-th previous frames, for example, first to fifth previous frames. The difference between the corresponding extracted frame and the previously extracted frames may simply be the sum of absolute values of differences between pixel values at the corresponding locations of the frames. Further, the difference may be obtained by estimating an optical flow well known in the prior art, and may be the sum of absolute values of differences between pixel values of images corrected using the estimated optical flow. Next, the frame selection unit 121 determines whether the difference between the corresponding frame and the previously extracted frames is equal to or greater than a preset threshold, and selects the corresponding frame if the difference is equal to or greater than the threshold. Here, for each selected frame, feature points are determined, the orientations of the feature points are estimated, and then pieces of feature data are configured, by the configuration which will be described later with reference to FIG. 10. By repeatedly performing the above procedure on all frames extracted from the video at regular time intervals, feature data about the entire video (that is, a set of pieces of frame-based feature data) is generated. In this case, when the corresponding frame is compared with only a single previous frame, the above-described difference is calculated only once, and it is determined whether to select the corresponding frame, whereas when the frame is compared with, for example, previous frames ranging to a fifth frame before the current frame, the corresponding frame may be selected if at least one difference with the respective frames is greater than a threshold.

Meanwhile, the frame selection unit 121 may calculate the difference between the corresponding frame and the previously extracted frames by comparing the corresponding frame with previously extracted frames using a reliability estimation scheme used by the above-described reliability estimation unit 22 without using the above-described method, and may select the corresponding frame based on the results of the calculation. That is, the frame selection unit 121 may use a method of, for each video, extracting frames constituting the video at regular time intervals, first generating image feature data of each extracted frame, comparing the image feature data with image feature data previously generated for previously extracted frames, determining pairs of corresponding feature points, estimating the reliability of analysis of relations between the extracted frame and the previously extracted frames using the method utilized by the above-described reliability estimation unit 22 based on the feature point orientation information of the feature points included in the determined feature point pairs, and then determining whether to select the corresponding frame based on the results of the estimation.

A frame-based feature point determination unit 122 performs the function of determining feature points for each frame selected by the frame selection unit 121, and extracting feature point information of the determined feature points, and this function is identical to that of the feature point determination unit 11 described with reference to FIGS. 1 to 8, but it should be noted that the name "frame-based feature point determination unit 122" has been used in that, for each frame, this function is performed. The reason for this is that a video may be regarded as a set of frames, and each frame is identical to each image described in the embodiment of FIGS. 1 to 8. Further, a frame-based feature point orientation estimation unit 123 and a frame-based feature data configuration unit 124 are also identical to the feature point orientation estimation unit 12 and the feature data configuration unit 13 described with reference to FIGS. 1 to 8. That is, the frame-based feature point determination unit 122, the frame-based feature point orientation estimation unit 123, and the frame-based feature data configuration unit 123 perform functions completely identical to those of the feature point determination unit 11, the feature point orientation estimation unit 12, and the feature data configuration unit 13 described in the embodiment of FIGS. 1 to 8, but there is a difference only in that the corresponding function is performed for each frame selected by the frame selection unit 121 from among the frames constituting the video. Therefore, a detailed description thereof will be omitted.

Figure 11:
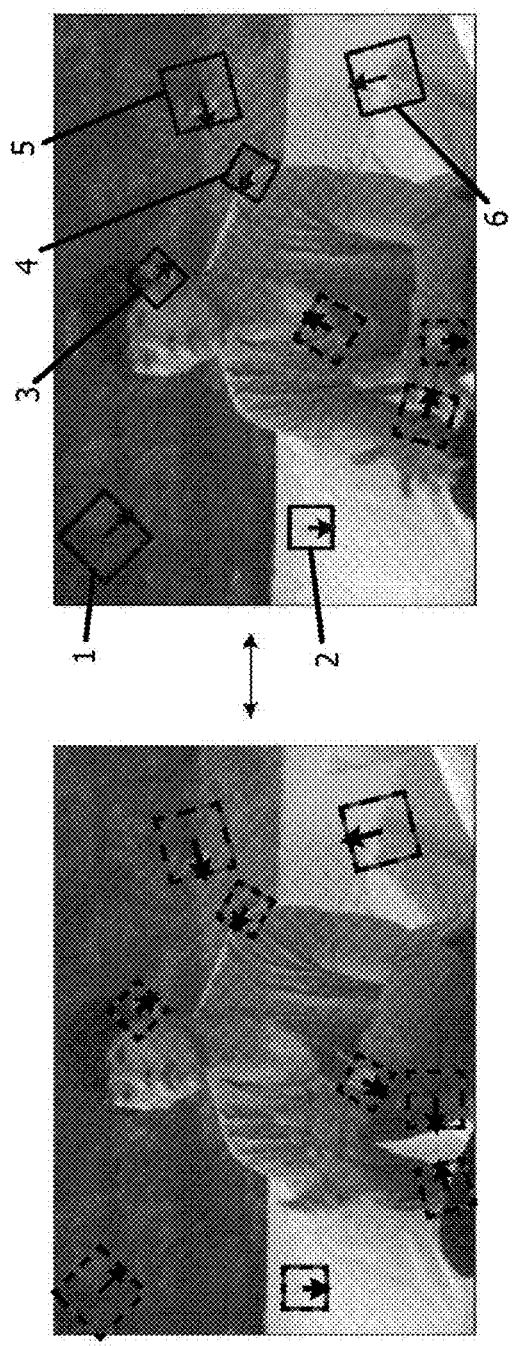
FIG. 11 illustrates an actual example of the removal of overlapping feature points.

Meanwhile, in FIG. 10, when the frame-based feature data configuration unit 124 configures feature data for each frame, feature points overlapping with those of a previous frame may be removed and feature data may be generated only for non-overlapping feature points. FIG. 11 illustrates an actual example in which overlapping feature points are removed. In FIG. 11, a left picture is a previous frame and a right picture is a current frame, which show that only feature points indicated by dotted lines on the right picture showing the current frame are recorded as non-overlapping feature points, and portions indicated by black solid lines (rectangles marked with 1, 2, 3, 4, 5, and 6) are feature points overlapping those of the previous frame (left picture) and are then removed.

Meanwhile, FIG. 10 shows a case where the video feature data generation unit 120 is separately provided with the frame selection unit 121, the frame-based feature point determination unit 122, the frame-based feature point orientation estimation unit 123, and the frame-based feature data configuration unit 123, but, as described above, the frame-based feature point determination unit 122, the frame-based feature point orientation estimation unit 123, and the frame-based feature data configuration unit 123 have functions identical to those of the feature point determination unit 11, the feature point orientation estimation unit 12, and the feature data configuration unit 13 described in the embodiment of FIGS. 1 to 8, and thus it is possible to omit those units and allow functions that must be performed by them to be performed by the image feature data generation unit 110. In this case, the video feature data generation unit 120 includes the frame selection unit 121, and generates pieces of frame-based feature data by performing the corresponding function for respective selected frames through the image feature data generation unit 110.

If the above process has been performed, the video feature data generation unit 120 obtains a set of pieces of frame-based image feature data for frames selected from among frames constituting the video, and generates video feature data based on the set. As described above with reference to FIGS. 1 to 8, the image feature data may be represented by feature data which is a set of feature points composed of, for example, (x coordinate, y coordinate, size, orientation, binary feature vector). The video feature data generated by the video feature data generation unit 120 may be configured to further include, for example, a video number as the identifier (ID) of the corresponding video, and, for example, a frame number as the ID of the corresponding frame, in addition to the image feature data. The image feature data of the frame configured in this way may be given as follows.

($v_i, f_j, x_k, y_k, s_k, \theta_k$, binary feature vector)

In this case, $v_i$ denotes an i-th video, $f_j$ denotes the j-th frame of the corresponding video, that is, i-th video, and $x_k$, $y_k$, $s_k$, and $\theta_k$ respectively denote the x coordinate value, y coordinate value, size, and orientation of a k-th feature point. The binary feature vector is generated as described above and may be represented by, for example, "011101" or the like. Since such video feature data has the same form as the image feature data generated by the above-described image feature extraction unit 10 except for video ID and frame ID, a comparison between an image and a video may be efficiently and promptly performed by referring to a hash generation unit 30, which will be described later.

Meanwhile, when there are a plurality of videos, the video feature data generation unit 120 may previously generate pieces of video feature data for respective videos, store the video feature data in a video feature database (not shown), perform a comparison with the image through a relation analysis unit, which will be described later, analyze a correlation indicating which video corresponds to the image, which frame of the video corresponds to the image, or whether identicalness is present, and provide the results of the analysis.

The hash generation unit 130 will be described by referring back to FIG. 9. The hash generation unit 130 functions to generate a hash table for the pieces of video feature data generated by the video feature data generation unit 120 by using one or more bits of each binary feature vector included in frame-based feature data as the index of the hash table, and is a component for more promptly performing searching through a hash search unit 141, which will be described later.

Figure 12:
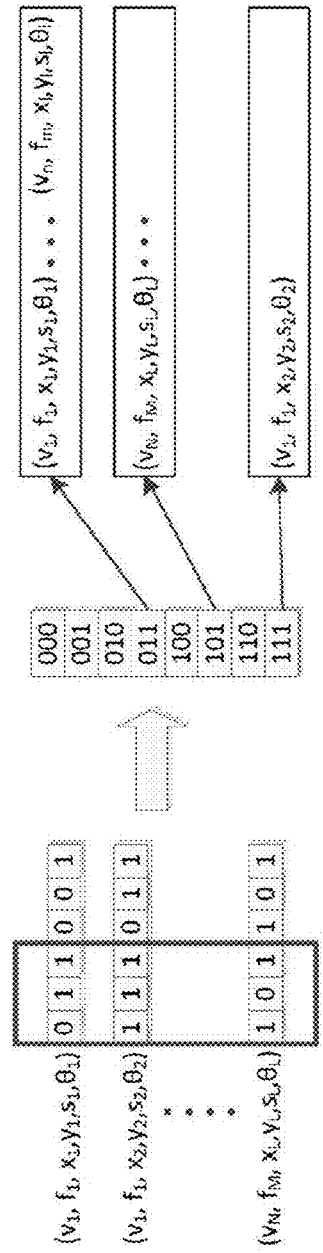
FIG. 12 illustrates an example of a process for generating a hash table using a hash generation unit 130.

FIG. 12 illustrates an example of a process for generating a hash table using the hash generation unit 130. Referring to FIG. 12, $v_i$ denotes a video number functioning as the ID of a video, $f_i$ denotes a frame number functioning as the ID of a frame in the video, $x_i$ and $y_i$ denote x and y coordinates of an i-th feature point in the corresponding frame, $s_i$ denotes the size of the i-th feature point of the corresponding frame, and $\theta_i$ denotes the orientation of the i-th feature point in the corresponding frame. Then, binary feature vectors formed by the above-described method are included. In this case, the buckets of the hash table are configured using only first k bits (upper 3 bits in FIG. 11) of the respective binary feature vectors, and ($v_i$, $f_j$, $x_i$, $y_i$, $s_i$, $\theta$) of the feature points corresponding to the respective buckets are inserted (see right side of FIG. 12), with the result that the hash table is generated. As described above, if the binary feature vectors are aligned in the sequence of importance, the hash table may be generated in the sequence of importance, so that a hash table insensitive to detailed differences between binary feature vectors may be generated. Meanwhile, in order to improve the precision of searching, a plurality of hash tables may be configured by selecting different bits.

Next, the relation analysis unit 140 of FIG. 9 is described again. As described above, the relation analysis unit 140 functions to compare image feature data with video feature data and to analyze the correlation between the image and the video. For this, as shown in FIG. 13, the relation analysis unit 140 may include a hash search unit 141, a candidate selection unit 142, a corresponding feature point determination unit 143, and a reliability estimation unit 144.

Figure 13:
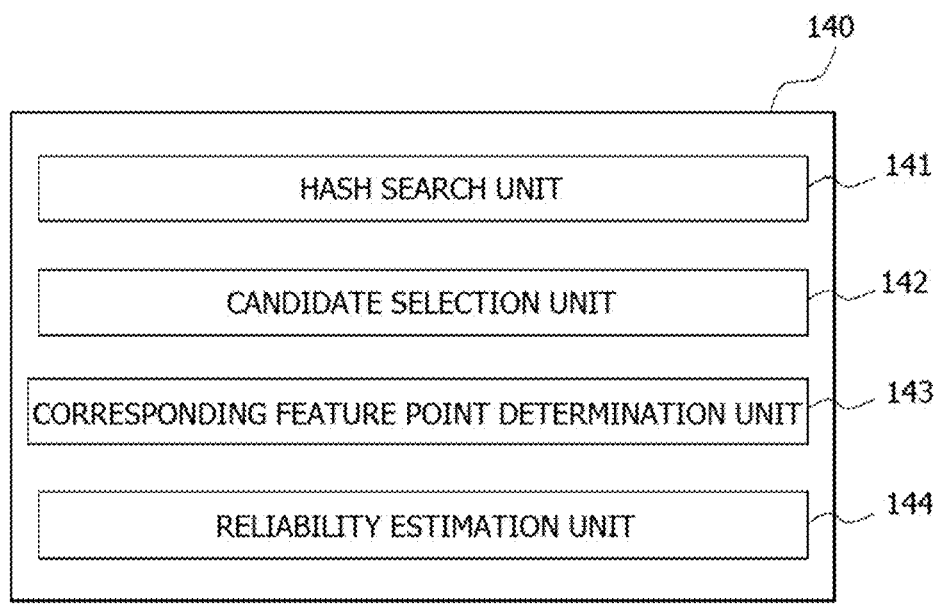
FIG. 13 is a diagram showing an example of the configuration of a relation analysis unit 140.

FIG. 13 is a diagram showing an example of the configuration of the relation analysis unit 140. The hash search unit 141 functions to search the hash table generated by the hash generation unit 130 by using one or more bits of each binary feature vector included in the image feature data as an index, and obtain video feature data belonging to the corresponding index.

As described above, the hash search unit 141 searches the hash table generated by the hash generation unit 130 based on the binary feature vectors included in the feature data generated by the image feature data generation unit 110 for respective feature points of the image as described above, first searches for a bucket matching a predetermined upper k bits (upper 3 bits in FIG. 12) of the binary feature vector of the corresponding feature point, and retrieves all ($v_i$, $f_j$, $x_i$, $y_i$, $s_i$, $\theta_j$) included in the found bucket.

The candidate selection unit 142 functions to determine a matching video by comparing the data found by the hash search unit 141 with the image feature data, and to determine one or more of frames constituting the determined video. That is, the candidate selection unit 142 compares image feature data with pieces of video feature data obtained by the hash search unit 141 and determines a video corresponding to video feature data having a highest match rate, and also determines a frame corresponding to the frame feature data having the highest match rate with the image feature data, among frames constituting the determined video. Based on the value $v_i$ from all values of $(v_i, f_j, x_i, y_i, s_i, \theta_i)$ retrieved by the hash search unit 141, the video having the highest match rate may be determined $v_i$ denotes a number functioning as the ID of the video, so that the matching video may be determined by searching for the most frequently appearing $v_i$ value. If what the video is, that is, the ID of the video has been determined, C frames corresponding to one or more frames having the highest match rate among frames of the video are determined based on $f_i$. As described above, since $f_i$ denotes the ID of the frame, $f_i$ values which most frequently appear in the corresponding video are sequentially found, and a predetermined number (for example, 5) of frames are selected from among the found $f_i$ values, thus enabling the frames to be determined.

Meanwhile, the candidate selection unit 142 may be configured to compare data found by the hash search unit 141 with frames included in each video and determine one or more matching frames, without comparing the found data with the image feature data and first determining a matching video. That is, the candidate selection unit 142 compares the image feature data with the pieces of video feature data obtained by the hash search unit 141 and determines the frame corresponding to frame feature data having the highest match rate with the image feature data among the frames constituting each video. As described above, a procedure for determining which video has the highest match rate, based on the $v_i$ value from all values of $(v_i, f_j, x_i, y_i, s_i, \theta_i)$ retrieved by the hash search unit 141 is omitted, and one or more, that is, C frames, having the highest match rate are determined from the frames of a specific video based on $f_i$. In this case, some of C frames may belong to other videos.

The corresponding feature point determination unit 143 functions to determine pairs of corresponding feature points between the image and one or more frames determined by the candidate selection unit 141, based on the image feature data of the image and pieces of image feature data of the determined frames. This unit performs the same function identical to the corresponding feature point determination unit 21 described in the embodiment of FIGS. 1 to 8, except that when there are a plurality of frames, the corresponding function is performed a number of times identical to the number of frames, and thus a detailed description thereof will be omitted.

The reliability estimation unit 144 functions to estimate the reliability of analysis of a relation between an image and a video, based on the feature point orientation information of feature points included in the feature point pairs determined by the corresponding feature point determination unit 143. This unit also has the same function as the reliability estimation unit 22 described in the embodiment of FIGS. 1 to 8, except that when there are a plurality of frames, the corresponding function is performed a number of times identical to the number of frames, and thus a detailed description thereof will be omitted. However, since the reliability estimation unit 144 may estimate reliability for the plurality of frames, information about similarity based on a probability value for each frame may be provided when the results of estimation are provided, and a frame having a highest probability value may be provided as the results of estimation.

Through the above process, the correlation analysis apparatus 200 of FIG. 9 may analyze correlations indicating which video an image belongs to, which frame of a video the image corresponds to, and a probability at which the image can be determined to match the specific frame of the video.

Figure 14:
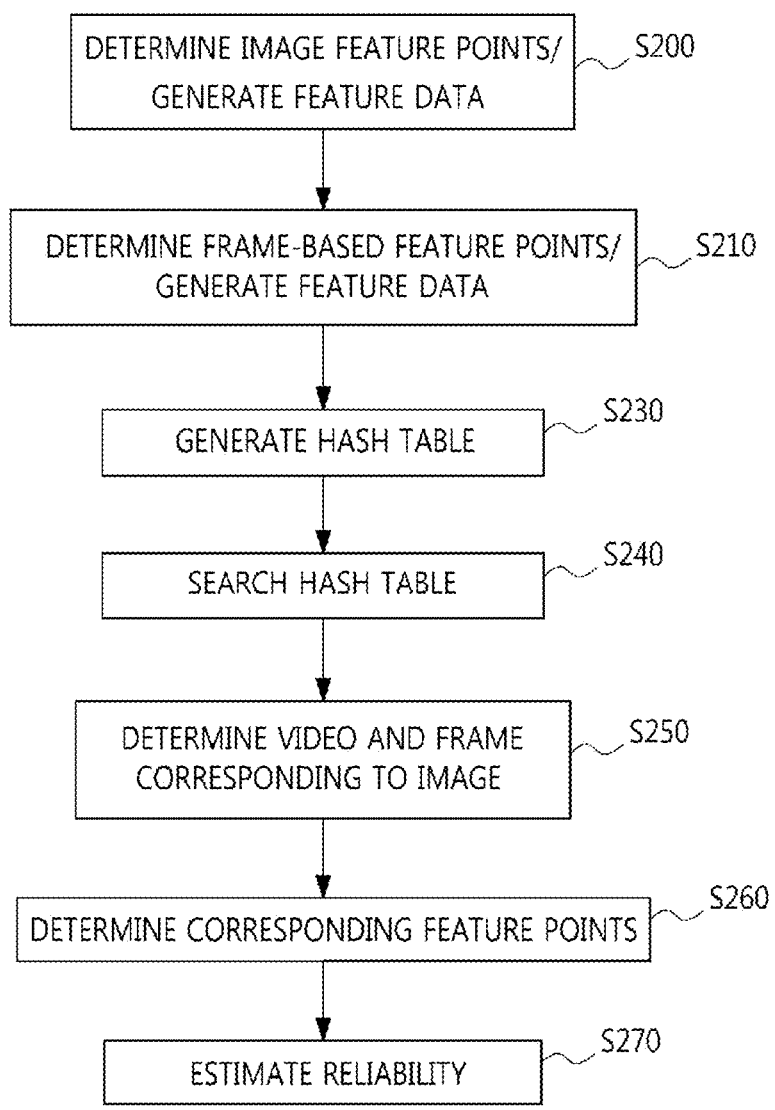
FIG. 14 is a flowchart showing an embodiment of a method of analyzing a correlation between an image and a video, which is performed by an apparatus 200 for analyzing a correlation between an image and a video according to the present invention.

FIG. 14 is a flowchart showing an embodiment of a method of analyzing a correlation between an image and a video, which is performed by the apparatus 200 for analyzing a correlation between an image and a video, which has been described with reference to FIGS. 9 to 13.

Referring to FIG. 14, the image feature data generation unit 110 determines feature points of an image, and generates image feature data including pieces of feature point orientation information for the respective feature points (S200). Further, the video feature data generation unit 120 determines, for a video, feature points for one or more of frames constituting the video, and generates frame-based image feature data including pieces of feature point orientation information for the respective determined frame-based feature points, thus generating video feature data (S210). For convenience of description, steps S200 and S210 are described as having a sequence, but the sequence may be changed and the steps may also be simultaneously performed. Further, it is apparent that when an image is queried for a plurality of videos, step S210 may be first performed on a plurality of videos.

Next, the hash generation unit 130 generates a hash table for pieces of video feature data generated by the video feature data generation unit 120 by using one or more bits of each binary feature vector included in the frame-based feature data as the index of the hash table (S220).

If the hash table is generated, the hash search unit 141 searches the hash table generated by the hash generation unit 130 by using one or more bits of each binary feature vector included in the image feature data as an index, and then obtains video feature data belonging to the corresponding index (S230). Next, the candidate selection unit 142 determines a matching video by comparing data found by the hash search unit 141 with the image feature data, and determines one or more of frames constituting the determined video (S240).

Next, the corresponding feature point determination unit 143 determines pairs of corresponding feature points between the image and one or more frames determined by the candidate selection unit 141 based on the image feature data of the image and pieces of image feature data of the determined frames (S250). The reliability estimation unit 144 estimates the reliability of analysis of a correlation between the image and the video based on the feature point orientation information of the feature points included in the feature point pairs determined by the corresponding feature point determination unit 143 (S260).

As described above, although the present invention has been described with reference to the preferred embodiments of the present invention, it should be understood that the present invention is not limited to the above embodiments and various modifications and changes can be implemented without departing from the scope of the present invention.

For example, in the embodiment of FIGS. 9 to 12, the hash generation unit 130 and the hash search unit 141 are not essential components and may then be omitted, and the reason for this is that they allow searching to be more promptly performed using a hash table. When these are omitted, the prior art enabling feature data to be suitably compared may be used or an alternative method used for data searching may be exploited.

The invention claimed is:
1. An apparatus for analyzing a correlation between images, comprising:

a feature data generation unit for determining feature points of each image, and generating feature data including pieces of feature point orientation information for the respective feature points; and a relation analysis unit for analyzing a correlation between an image and another image using the feature data generated by the feature data generation unit, wherein at least one of the feature data generation unit and the relation analysis unit is implemented by a hardware computing device;

wherein the relation analysis unit comprises a corresponding feature point determination unit for determining pairs of corresponding feature points between the images to be compared using the feature data generated by the feature data generation unit, and a reliability estimation unit for estimating reliability of analysis of a correlation between the images, based on the feature point orientation information of the feature points included in the feature point pairs determined by the corresponding feature point determination unit;

wherein the reliability estimation unit estimates the reliability of the analysis of the relation between the images, based on a probability density function for estimated values of differences between orientations of the feature points included in the respective feature point pairs; and wherein the probability density function is used to calculate a mean and a variation of the estimated values, a probability (p) of pairs of feature points being observed is calculated using a standard normal distribution function based on the mean and the variation, and the calculated probability (p) or a function based on the probability (p) is compared with a threshold, thus enabling the reliability of the analysis of the correlation between the images to be estimated.

2. The apparatus of claim 1, wherein the probability (p) of the pairs of feature points being observed is calculated by $$p = \prod_{i=1}^{n} G\left(\frac{\hat{d}_i - \hat{d}}{\sigma}\right)$$

(where n denotes a number of pairs of corresponding feature points, G denotes a probability function of a standard normal distribution having a mean of 0 and a standard deviation of 1, and $\hat{d}$ denotes a mean of differences between orientations of all feature point pairs $$(\hat{d} = \frac{1}{n}\sum_{i=1}^{n} \theta(p_i) - \theta(q_i)),$$

and $\hat{d}_i$ denotes estimated values of the differences between the orientations of all feature point pairs based on the probability density function).

3. An apparatus for analyzing a correlation between images, comprising:

a feature data generation unit for determining feature points of each image, and generating feature data including pieces of feature point orientation information for the respective feature points; and a relation analysis unit for analyzing a correlation between an image and another image using the feature data generated by the feature data generation unit, wherein at least one of the feature data generation unit and the relation analysis unit is implemented by a hardware computing device;

wherein the relation analysis unit comprises a corresponding feature point determination unit for determining pairs of corresponding feature points between the images to be compared using the feature data generated by the feature data generation unit, and a reliability estimation unit for estimating reliability of analysis of a correlation between the images, based on the feature point orientation information of the feature points included in the feature point pairs determined by the corresponding feature point determination unit;

wherein the reliability estimation unit estimates the reliability of the analysis of the relation between the images, based on a probability density function for estimated values of differences between orientations of the feature points included in the respective feature point pairs;

wherein the feature data generation unit comprises:

a feature point determination unit for determining feature points from each image and extracting feature point information of the determined feature points;

a feature point orientation estimation unit for estimating pieces of orientation information for the respective feature points determined by the feature point determination unit; and a feature data configuration unit for generating binary feature vectors based on the feature point information and the orientation information, for the respective feature points determined by the feature point determination unit, and generating feature data of the image including the generated binary feature vectors; and wherein the feature data configuration unit generates, for the feature points determined by the feature point determination unit, surrounding image areas including the respective feature points, aligns the generated surrounding image areas in an identical orientation based on the orientation information, divides each of aligned surrounding image areas into sub-regions, and generates binary feature vectors based on averages of brightness values of the divided sub-regions.

4. The apparatus of claim 3, wherein each binary feature vector is generated by at least one selected from among difference vectors and double-difference vectors obtained from the averages of brightness values of the sub-regions, wherein selection of at least one from among the difference vectors and the double-difference vectors obtained from averages of brightness values of the sub-regions is performed in correspondence with respective bits of the binary feature vector, and wherein a linear combination or a nonlinear combination is calculated for the difference vectors and the double-difference vectors selected in correspondence with the respective bits, and resulting values of the calculation are compared with a threshold, thus enabling values of corresponding bits of the binary feature vector to be determined.

5. The apparatus of claim 4, wherein alignment is performed based on a criterion preset for the respective bits of the binary feature vector.

6. A method of analyzing a correlation between images, comprising:

a first step of determining feature points of each image, and generating feature data including pieces of feature point orientation information for the respective feature points; and a second step of analyzing a correlation between an image and another image using the feature data generated at the first step, wherein the second step comprises:

2-1) determining pairs of corresponding feature points between the images to be compared using the generated feature data; and 2-2) estimating reliability of analysis of a correlation between the images, based on the feature point orientation information of the feature points, wherein the step of 2-2 is configured to estimate the reliability of the analysis of the relation between the images, based on a probability density function for estimated values of differences between orientations of the feature points included in the respective feature point pairs, and wherein the step of 2-2 further includes calculating a mean and a variation of the estimated values using the probability density function, calculating a probability (p) of pairs of feature points being observed using a standard normal distribution function based on the mean and the variation, and comparing the calculated probability (p) or a function based on the probability (p) with a threshold, so as to estimate the reliability of the analysis of the correlation between the images.

7. An apparatus for analyzing a correlation between an image and a video, comprising:

an image feature data generation unit for determining feature points of an image and generating image feature data including pieces of feature point orientation information for the respective feature points;

a video feature data generation unit for determining, for a video, feature points for one or more of frames constituting the video, and generating pieces of frame-based image feature data including pieces of feature point orientation information for the respective frame-based feature points, thus generating video feature data; and a relation analysis unit for comparing the image feature data with the video feature data and then analyzing a correlation between the image and the video, wherein at least one of the image feature data generation unit, the video feature data generation unit and the relation analysis unit is implemented by a hardware computing device;

wherein the relation analysis unit comprises:

a candidate selection unit for determining a matching video by comparing the image feature data with the pieces of frame-based image feature data of the video feature data, and determining one or more of frames constituting the determined video, or for determining one or more matching frames by comparing the image feature data with the pieces of frame-based image feature data of the video feature data;

a corresponding feature point determination unit for determining pairs of corresponding feature points between the image and the one or more frames determined by the candidate selection unit, based on the image feature data of the image and pieces of image feature data of the determined frames; and a reliability estimation unit for estimating reliability of analysis of the correlation between the image and the video based on pieces of feature point orientation information of feature points included in the feature point pairs determined by the corresponding feature point determination unit, wherein the reliability estimation unit estimates the reliability of the analysis of the relation between the image and the video, based on a probability density function for estimated values of differences between orientations of the feature points included in the respective feature point pairs, and wherein:

the image feature data generation unit comprises:

an image feature point determination unit for determining feature points from the image and extracting feature point information of the determined feature points;

an image feature point orientation estimation unit for estimating pieces of orientation information for the respective feature points determined by the feature point determination unit; and an image feature data configuration unit for generating binary feature vectors based on the feature point information and the orientation information, for the respective feature points determined by the feature point determination unit, and generating feature data of the image including the generated binary feature vectors, and the video feature data generation unit comprises:

a frame selection unit for extracting, for each video, frames constituting the video at regular time interval, calculating a difference between each extracted frame and one or more previously extracted frames, and selecting the extracted frame when the difference is equal to or greater than a threshold;

a frame-based feature point determination unit for determining feature points for the frame selected by the frame selection unit and extracting feature point information of the determined feature points;

a frame-based feature point orientation estimation unit for estimating pieces of orientation information for the respective feature points determined by the frame-based feature point determination unit; and a frame-based feature data configuration unit for generating binary feature vectors based on the feature point information and the orientation information, for the respective feature points determined by the frame-based feature point determination unit, and configuring frame-based feature data including the generated binary feature vectors.

8. A method of analyzing a correlation between an image and a video, comprising:

a first step of determining feature points of an image and generating image feature data including pieces of feature point orientation information for the respective feature points;

a second step of determining, for a video, feature points for one or more of frames constituting the video, and generating pieces of frame-based image feature data including pieces of feature point orientation information for the respective frame-based feature points, thus generating video feature data; and a third step of comparing the image feature data with the video feature data and then analyzing a correlation between the image and the video, wherein the third step comprises the steps of:

3-1) determining a matching video by comparing the image feature data with the pieces of frame-based image feature data of the video feature data, and determining one or more of frames constituting the determined video, or for determining one or more matching frames by comparing the image feature data with the pieces of frame-based image feature data of the video feature data;

3-2) determining pairs of corresponding feature points between the image and the one or more frames determined at 3-1), based on the image feature data and pieces of image feature data of the determined frames; and 3-3) estimating reliability of analysis of the correlation between the image and the video based on pieces of feature point orientation information of feature points included in the feature point pairs determined at 3-2), wherein the step of 3-3) is configured to estimate the reliability of the analysis of the relation between the image and the video, based on a probability density function for estimated values of differences between orientations of the feature points included in the respective feature point pairs, and wherein:

the first step further comprises:

determining the feature points from the image and extracting feature point information of the determined feature points;

estimating pieces of orientation information for the respective feature points determined by the feature point determination unit; and generating binary feature vectors based on the feature point information and the orientation information, for the respective feature points determined by the feature point determination unit, and generating feature data of the image including the generated binary feature vectors, and the second step further comprises:

extracting, for each video, frames constituting the video at regular time interval, calculating a difference between each extracted frame and one or more previously extracted frames, and selecting the extracted frame when the difference is equal to or greater than a threshold;

determining feature points for the frame selected by the frame selection unit and extracting feature point information of the determined feature points;

estimating pieces of orientation information for the respective feature points determined by the frame-based feature point determination unit; and generating binary feature vectors based on the feature point information and the orientation information, for the respective feature points determined by the frame-based feature point determination unit, and configuring frame-based feature data including the generated binary feature vectors.

* * * * *